United States Patent
Weh

(10) Patent No.: US 9,022,489 B2
(45) Date of Patent: May 5, 2015

(54) PUMP HOUSING FOR MOTOR-VEHICLE HYDRAULIC ASSEMBLIES AND THE USE THEREOF

(75) Inventor: Andreas Weh, Sulzberg (DE)

(73) Assignee: Robert Bosch GmbH, Stuttgart (DE)

( * ) Notice: Subject to any disclaimer, the term of this patent is extended or adjusted under 35 U.S.C. 154(b) by 110 days.

(21) Appl. No.: 13/990,322

(22) PCT Filed: Oct. 11, 2011

(86) PCT No.: PCT/EP2011/067710
§ 371 (c)(1),
(2), (4) Date: Nov. 9, 2013

(87) PCT Pub. No.: WO2012/072319
PCT Pub. Date: Jun. 7, 2012

(65) Prior Publication Data
US 2014/0060033 A1   Mar. 6, 2014

(30) Foreign Application Priority Data

Nov. 30, 2010   (DE) .......................... 10 2010 062 171

(51) Int. Cl.
*B60T 8/40* (2006.01)
*F15B 9/09* (2006.01)
*B60T 8/36* (2006.01)

(52) U.S. Cl.
CPC . *F15B 9/09* (2013.01); *B60T 8/368* (2013.01); *Y10S 303/10* (2013.01)

(58) Field of Classification Search
USPC .................. 303/10, 116.1, DIG. 10, 119.3
See application file for complete search history.

(56) References Cited

U.S. PATENT DOCUMENTS 6,554,375 B1    4/2003   Dinkel et al.
(Continued)

FOREIGN PATENT DOCUMENTS

DE   101 07 814 A1   5/2002
DE   101 45 540 A1   2/2003
(Continued)

OTHER PUBLICATIONS

International Search Report corresponding to PCT Application No. PCT/EP2011/067710, mailed Feb. 28, 2012 (German and English language document) (11 pages).

*Primary Examiner* — Christopher Schwartz
(74) *Attorney, Agent, or Firm* — Maginot, Moore & Beck LLP

(57) ABSTRACT

In a pump housing of a motor-vehicle hydraulic assembly, on which at least two inlet-valve openings, at least two outlet-valve openings, at least one high-pressure control valve opening and at least one switchover-valve opening and a pressure-sensor connection are formed. The at least two inlet-valve openings are arranged in a first row, the at least two outlet-valve openings are arranged in a following second row, the pressure sensor connection is arranged in a further following third row, and the at least one high-pressure control valve opening and the at least one switchover valve opening are arranged in a further following fourth row. There are also five embodiments of arrangements of connecting lines and holes in a pump housing for the short connection of the valve openings and connections, and one embodiment with respect to the use of the pump housing according to one of the six embodiments.

9 Claims, 9 Drawing Sheets

(56) References Cited

U.S. PATENT DOCUMENTS

| | | | |
|---|---|---|---|
| 7,753,456 B2* | 7/2010 | Iyatani | 303/119.3 |
| 8,500,218 B2* | 8/2013 | Fischbach-Borazio et al. | 303/116.1 |
| 8,523,295 B2* | 9/2013 | Bareiss et al. | 303/119.3 |
| 2006/0138860 A1* | 6/2006 | Hinz et al. | 303/119.3 |
| 2007/0228820 A1* | 10/2007 | Nakamura | 303/119.3 |

FOREIGN PATENT DOCUMENTS

| | | |
|---|---|---|
| DE | 102 37 163 A1 | 2/2004 |
| JP | 2002-520211 A | 7/2002 |
| JP | 2004-75052 A | 3/2004 |
| JP | 2006-151129 A | 6/2006 |
| JP | 2006-282027 A | 10/2006 |
| JP | 2010-52519 A | 3/2010 |

* cited by examiner state of the art

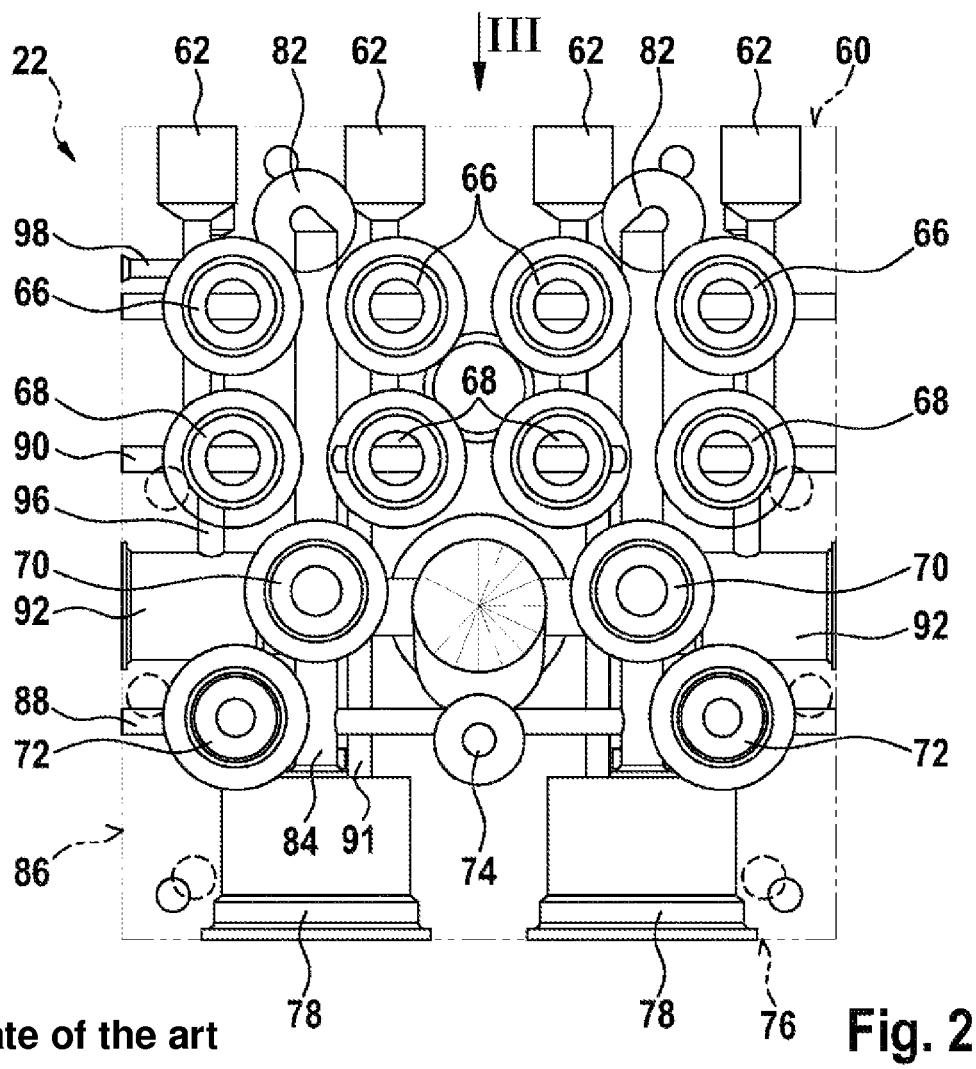
state of the art  Fig. 2
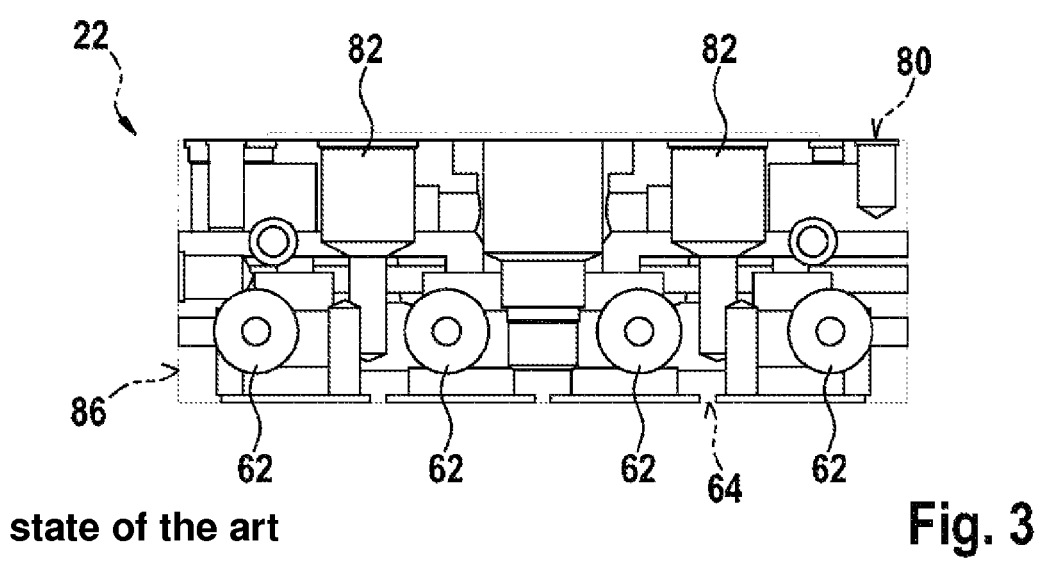
state of the art  Fig. 3 state of the art

PUMP HOUSING FOR MOTOR-VEHICLE HYDRAULIC ASSEMBLIES AND THE USE THEREOF

This application is a 35 U.S.C. §371 National Stage Application of PCT/EP2011/067710, filed on Oct. 11, 2011, which claims the benefit of priority to Serial No. DE 10 2010 062 171.4, filed on Nov. 30, 2010 in Germany, the disclosures of which are incorporated herein by reference in their entirety.

BACKGROUND

The disclosure relates to a pump housing of a motor vehicle hydraulic assembly, on which at least two inlet valve openings, at least two outlet valve openings, at least one high-pressure control valve opening and at least one switching valve opening are formed together with a pressure sensor connection. Also provided on the pump housing are, in particular, at least one master cylinder connection with a line connected thereto, at least one switching valve opening, at least a first connecting line between a pump element opening and an accumulator opening, at least a second connecting line between the pump element opening and an inlet valve opening, and at least a third connecting line between two outlet valve openings. The disclosure also relates to a motor vehicle hydraulic assembly having such a pump housing.

Hydraulic assemblies are used on motor vehicles, such as automobiles or trucks, for example, in order to provide controlled brake pressures on their brake system. Such hydraulic assemblies are used, in particular, to perform the functions of an antilock brake system (ABS), a traction control system (TCS) and/or an electronic stability program (ESP). On the brake system a brake pressure is generated on a master cylinder by way of a brake pedal, in particular by a driver of the motor vehicle. For regulating this brake pressure the hydraulic assemblies comprise a pump having multiple pump pistons or pump elements, a motor and a plurality of valves. The valves are usually solenoid-controlled, so that different brake pressures can be provided on individual brakes or brake circuits. At least one master cylinder connection opening is formed on the hydraulic assembly for hydraulically connecting the hydraulic assembly to the master cylinder.

The pump housing of such a hydraulic assembly is usually of a cuboid or block-shaped design made from aluminum and is provided with bores for arrangement of the components and lines.

An object of the disclosure is to create a motor vehicle hydraulic assembly having a pump housing, which is of more compact design and more cost-effective to produce than known pump housings.

SUMMARY

The object is achieved by a pump housing of a motor vehicle hydraulic assembly, on which at least two inlet valve openings, at least two outlet valve openings, at least one high-pressure control valve opening and at least one switching valve opening are formed, together with a pressure sensor connection. According to the disclosure at least the two inlet valve openings are arranged in a first row, at least the two outlet valve openings are arranged in a succeeding second row, the pressure sensor connection is arranged in a further succeeding third row and at least the one high-pressure control valve opening is arranged together with at least the one switching valve opening in a further succeeding fourth row. Such an arrangement leads to an especially compact overall construction of the hydraulic assembly.

Two switching valve openings are preferably arranged between two high-pressure control valve openings. This design affords an especially compact coupling of an electrical control unit, on which solenoid coils for the valves are to be arranged.

The object is further achieved by a pump housing of a motor vehicle hydraulic assembly, particularly one of the aforementioned type, having at least one master cylinder connection and a suction line connected thereto, in which housing the pressure sensor connection opens directly into the suction line. This design eliminates an additional bore that would otherwise be necessary for connecting the pressure sensor connection.

The object is further achieved by a pump housing of a motor vehicle hydraulic assembly, particularly one of the aforementioned type, having at least one master cylinder connection and a line connected thereto, together with at least one switching valve opening and at least one high-pressure control valve opening, in which housing at least the one switching valve opening and/or at least the one high-pressure control valve opening is connected to the line by means of a recess. This design obviates the need to form a bore in the hydraulic assembly specifically for connecting the switching valve opening and/or the high-pressure control valve opening.

In addition the object is achieved by a pump housing of a motor vehicle hydraulic assembly, particularly one of the aforementioned type, having at least one high-pressure control valve opening and at least a first connecting line between a pump element opening and an accumulator opening, in which housing the high-pressure control valve opening is connected to the first connecting line by way of a first bore, in particular a first blind bore. With this design it is possible to keep the first bore especially short, thereby leading to low manufacturing costs and taking up only a small overall space.

The object is also achieved by a pump housing of a motor vehicle hydraulic assembly, particularly one of the aforementioned type, having at least one switching valve opening and at least one pump element opening, which is connected to an inlet valve opening by way of a second connecting line, in which housing the switching valve opening is connected to the second connecting line by way of a second bore, in particular a second blind bore. The second bore creates a fluid-carrying connection between the switching valve opening and the pump element opening by means of a diversion via the inlet valve opening, and in so doing utilizes an existing line connection between the inlet valve opening and the pump element opening. With this procedure for coupling the switching valve opening to the pump element opening, therefore, only a short additional length of line needs to be formed.

The object is also achieved by a pump housing of a motor vehicle hydraulic assembly, particularly one of the aforementioned type, having at least one accumulator opening and at least two outlet valve openings, which are connected to one another by way of a third connecting line, in which housing the accumulator opening is connected to the third connecting line by way of a third bore, in particular a third blind bore. With this procedure the accumulator opening may have a fluid-carrying connection to both outlet valve openings, again by way of a particularly short bore.

An accumulator is advantageously coupled to the accumulator opening by welding, thereby likewise affording a solution that is especially cost-effective to produce, easy to preassemble and very compact overall.

Finally the object is also achieved by the use of such a pump housing according to the disclosure on a motor vehicle hydraulic assembly.

BRIEF DESCRIPTION OF THE DRAWINGS

An exemplary embodiment of the solution according to the disclosure is described in more detail below with reference to the schematic drawings attached, of which:

FIG. 2 shows a front view of a pump housing according to the state of the art, FIG. 3 shows the top view III according to FIG. 2.

DETAILED DESCRIPTION

Figure 1:
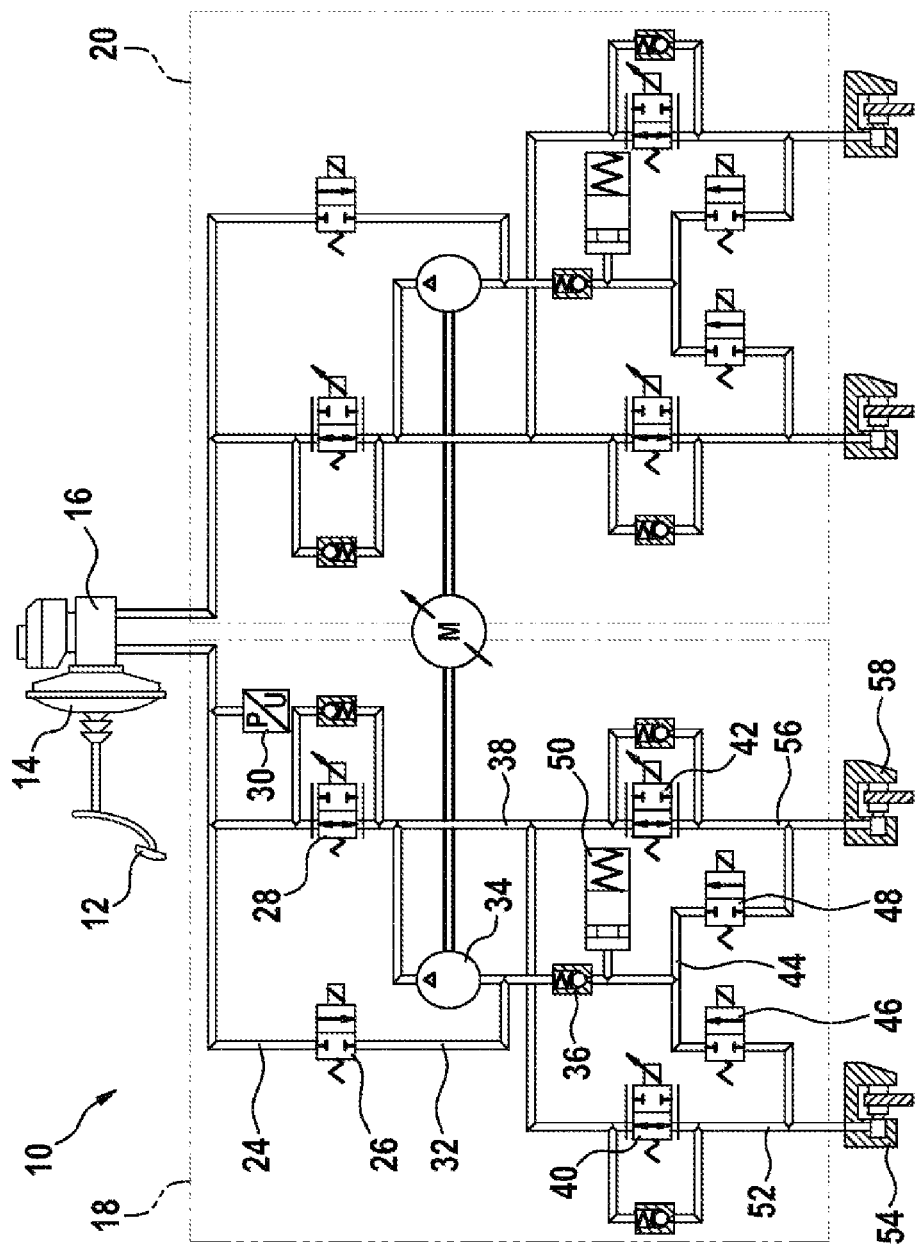
FIG. 1 shows a hydraulic diagram of a vehicle brake system according to the state of the art, as is also depicted with a pump housing according to the disclosure.

A vehicle brake system 10 represented in FIG. 1 comprises a brake pedal 12 having a brake booster 14 and a master cylinder 16 connected thereto. The master cylinder 16 is connected to two brake circuits 18 and of largely identical construction, which are depicted substantially in a common pump housing 22 (see FIG. 2 et seq.). Only one of these brake circuits, that is the brake circuit 18, is described in more detail below.

For the brake circuit 18 a line 24 leads from the master cylinder 16 to a high-pressure control valve 26 and a switching valve 28. A pressure sensor 30 is furthermore connected to the line 24. From the high-pressure control valve 26 a line 32 leads to the suction side of the pump element 34 and to a non-return valve 36. From the switching valve 28 a line 38 leads to the delivery side of the pump element 34 and to a first inlet valve 40 and a second inlet valve 42. From the non-return valve 36 a line 44 leads to a first outlet valve 46 and a second outlet valve 48. An accumulator 50 is furthermore connected to the line 44. From the first inlet valve 40 a line 52 leads to a first wheel brake cylinder 54 and to the first outlet valve 46 and from the second inlet valve 42 a line 56 leads to a second wheel brake cylinder 58 and to the second outlet valve 48.

Figure 4:
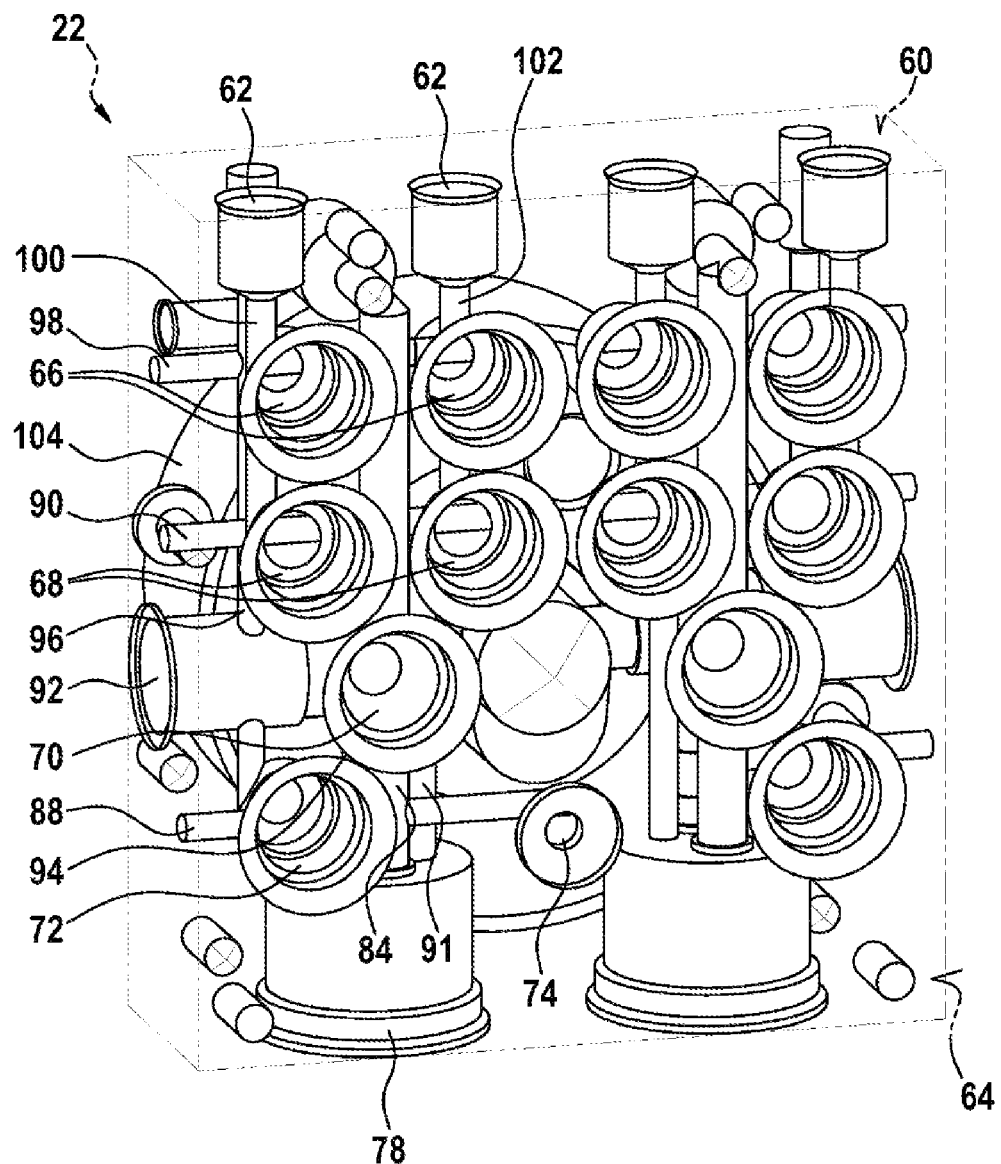
FIG. 4 shows a perspective front view of the pump housing according to FIGS. 2 and 3.

FIGS. 2 to 4 represent a pump housing 22 according to the state of the art, which is substantially formed from an aluminum block, in which openings are formed by drilling and/or milling. Thus four wheel brake cylinder openings 62 for receiving the aforementioned connections for the wheel brake cylinders 54 and 58 are situated on the top 60 of the aluminum block and four inlet valve openings 66 for receiving the aforementioned inlet valves 40 and 42 are situated in a top row on the front 64 of the aluminum block. Situated in a second row below the inlet valve openings 66 are four outlet valve openings 68 for receiving the aforementioned outlet valves 46 and 48. Below the outlet valve openings 68 two high-pressure control valve openings 70 are then arranged in a third row, and in a fourth row situated below these, two switching valve openings 72 are arranged on the outside together with a central pressure sensor connection 74 for receiving an aforementioned high-pressure control valve 26, a switching valve 28 and the pressure sensor 30.

Two accumulator openings 78 for receiving an aforementioned accumulator 50 are situated on the underside 76 of the aluminum block, and two master cylinder connections 82 are situated on the rear side 80. The aforementioned line 24 in the form of a longitudinal bore 84 introduced into the accumulator opening 78 extends between an accumulator opening 78 and an associated master cylinder connection 82. A transverse bore 88, which connects the longitudinal bore 84 to the centrally arranged pressure sensor connection 74, is formed towards this longitudinal bore 84 from the left-hand side 86 of the aluminum block. Here the transverse bore 88 extends through a switching valve opening 72, so that this is also connected to the longitudinal bore 84. Furthermore an outwardly directed, open high-pressure control valve opening 70 also opens into the longitudinal bore 84.

Two outlet valve openings 68 are likewise connected by way of a transverse bore 90 and a longitudinal bore 91 to an associated accumulator opening 78, in order to form the aforementioned line 44. A high-pressure control valve opening 70, connected to the longitudinal bore 84, is further connected to a pump element opening 92, which is formed into the aluminum block from the side. The pump element opening 92 is furthermore connected to the accumulator opening 78 by way of a longitudinal bore 94, in which the non-return valve 36 is arranged at the transition from the longitudinal bore 94 into the accumulator opening 78, in order to form the aforementioned line 32.

The switching valve opening 72 connected to the transverse bore 88 is furthermore connected by means of a longitudinal bore 96 to the pump element opening 92, and by means of a further transverse bore 98 to two inlet valve openings 66, in order to form the aforementioned line 38. The aforementioned lines 52 and 56 are finally formed by means of longitudinal bores 100 and 102, which in each case are led from one of the wheel brake cylinder openings 62 to an associated inlet valve opening 66 and an outlet valve opening 68.

A motor connection to an associated drive motor 104 for the pump elements 34 to be arranged in the pump element openings 92 is situated on the rear side of this type of aluminum block.

FIGS. 5 to 11 illustrate a pump housing 22 according to the disclosure, in which four wheel brake cylinder openings 62, four inlet valve openings 66, four outlet valve openings 68, two high-pressure control valve openings 70, two switching valve openings 72, a pressure sensor connection 74, two accumulator openings 78, two master cylinder connections 82, two pump element openings 92 and a motor connection to a drive motor 104 are provided. In the design of the pump housing 22 according to the disclosure, however, the openings and the associated bores are arranged and formed differently from the state of the art.

Figure 5:
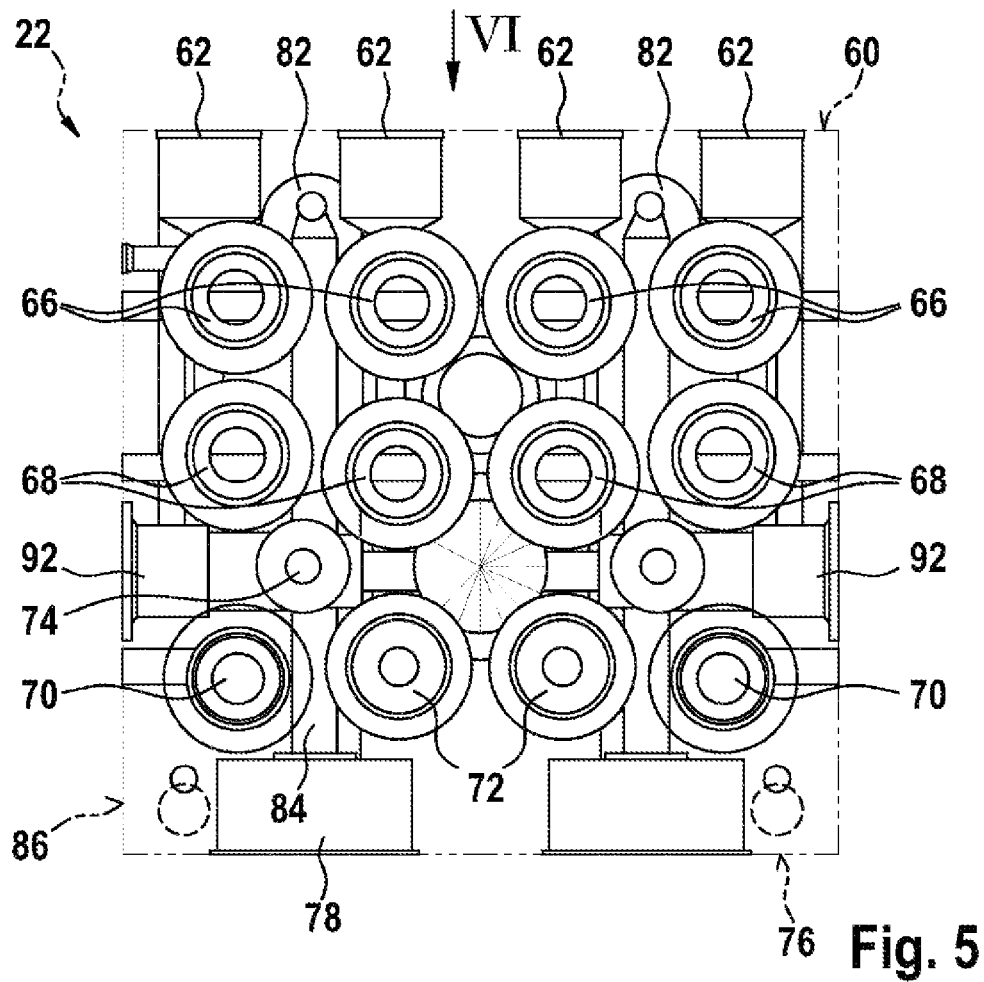
FIG. 5 shows a front view of an exemplary embodiment of a pump housing according to the disclosure.
Figure 6:
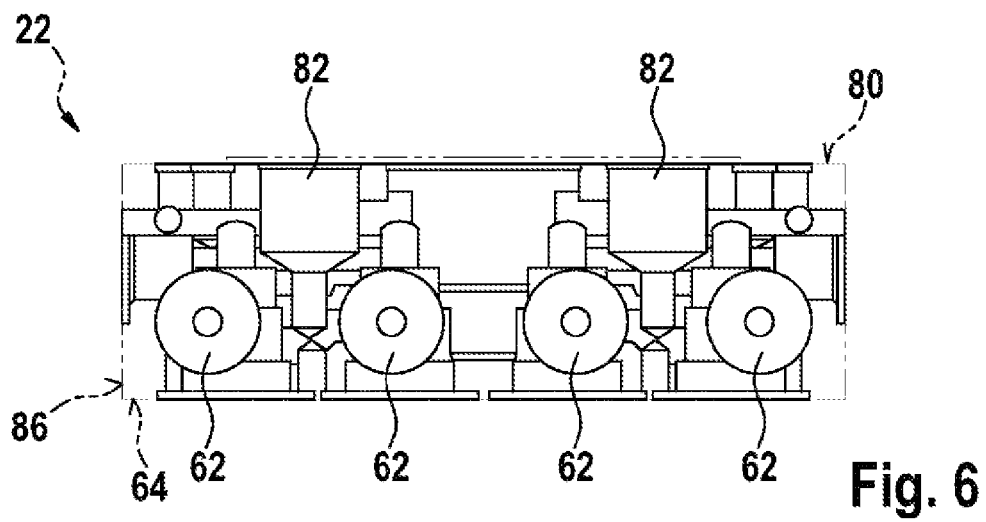
FIG. 6 shows the top view VI according to FIG. 5.
Figure 7:
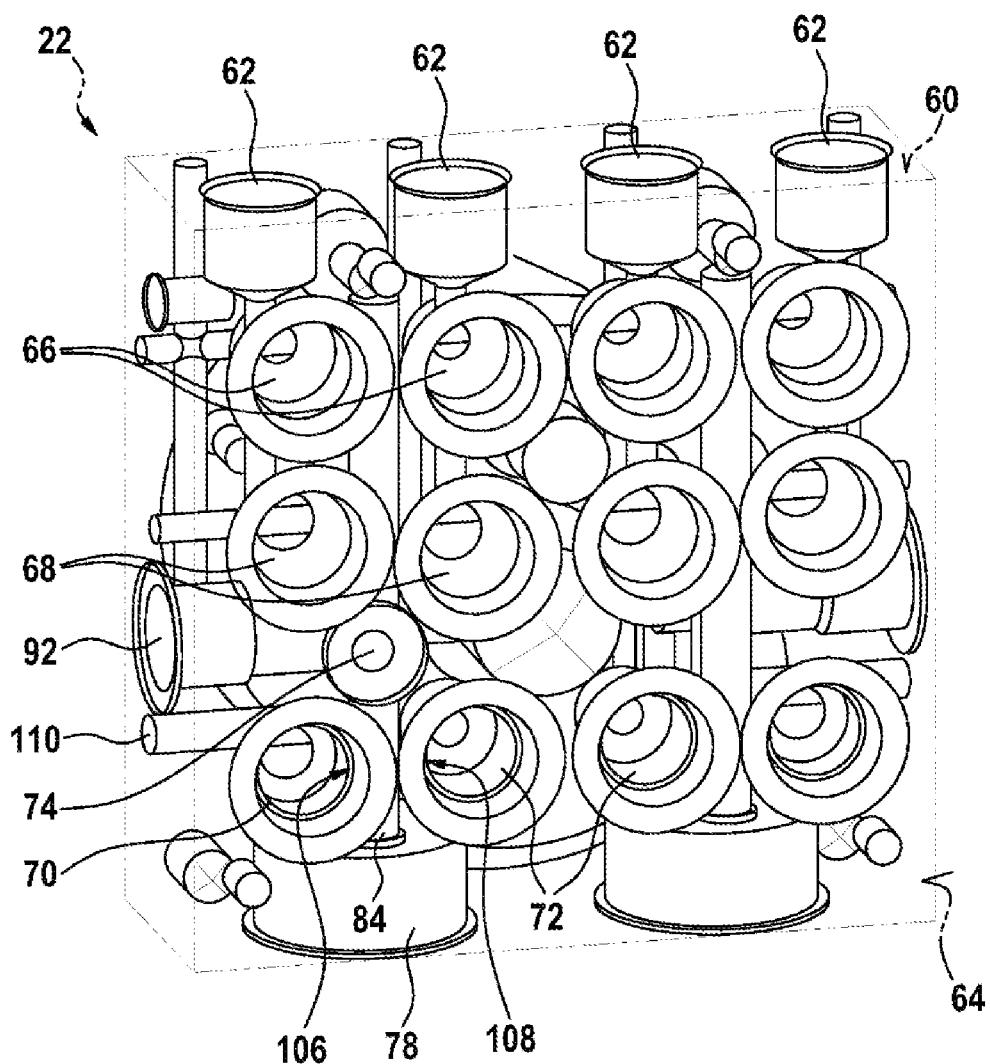
FIG. 7 shows a perspective front view of the pump housing according to FIGS. 5 and 6 with a first and second detail illustrated.

Thus, in the pump housing 22 according to the disclosure as shown in FIGS. 5 and 7, the inlet valve openings 66 are arranged in a first row on the front 64 thereof, the outlet valves 68 in a succeeding second row, the pressure sensor connection 74 in a further succeeding third row and the two high-pressure control valve openings 70 and the two switching valve openings 72 in a further succeeding fourth row. Here the pressure sensor connection 74 opens directly into the longitudinal bore 84 likewise provided, so that a transverse bore 88, as in the embodiment according to FIGS. 2 to 4, can be dispensed with.

The two switching valve openings 72 are arranged between the two high-pressure control valve openings 70. The single switching valve opening 72 and the single high-pressure control valve opening 70 are each connected to the longitudinal bore 84 by means of a recess 106 and 108 respectively. This design obviates the need for a transverse bore 88 specifically for connecting the switching valve opening 72, as would have to be formed in the embodiment according to FIGS. 2 to 4.

Figure 8:
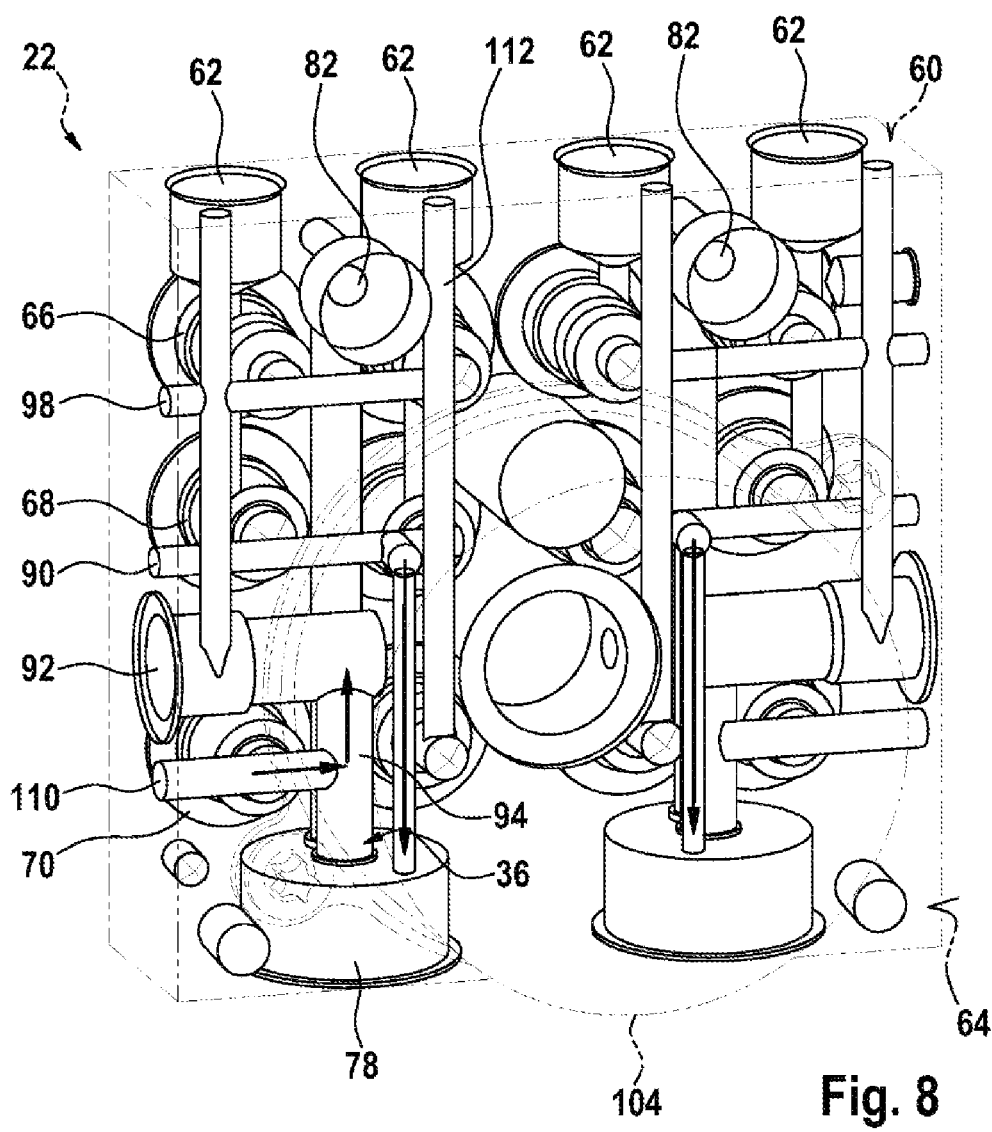
FIG. 8 shows a perspective rear view of the pump housing according to FIG. 7 with a third detail illustrated.

As illustrated separately in FIG. 8, the line 32 between a pump element opening 92, an associated accumulator opening 78 and a high-pressure control valve opening 70 is configured by means of the longitudinal bore 94 likewise formed and a transverse bore 110 designed as a blind bore. Here the transverse bore 110 may be of particularly short design. Here the longitudinal bore 94 is the bore for receiving the non-return valve 36.

Figure 9:
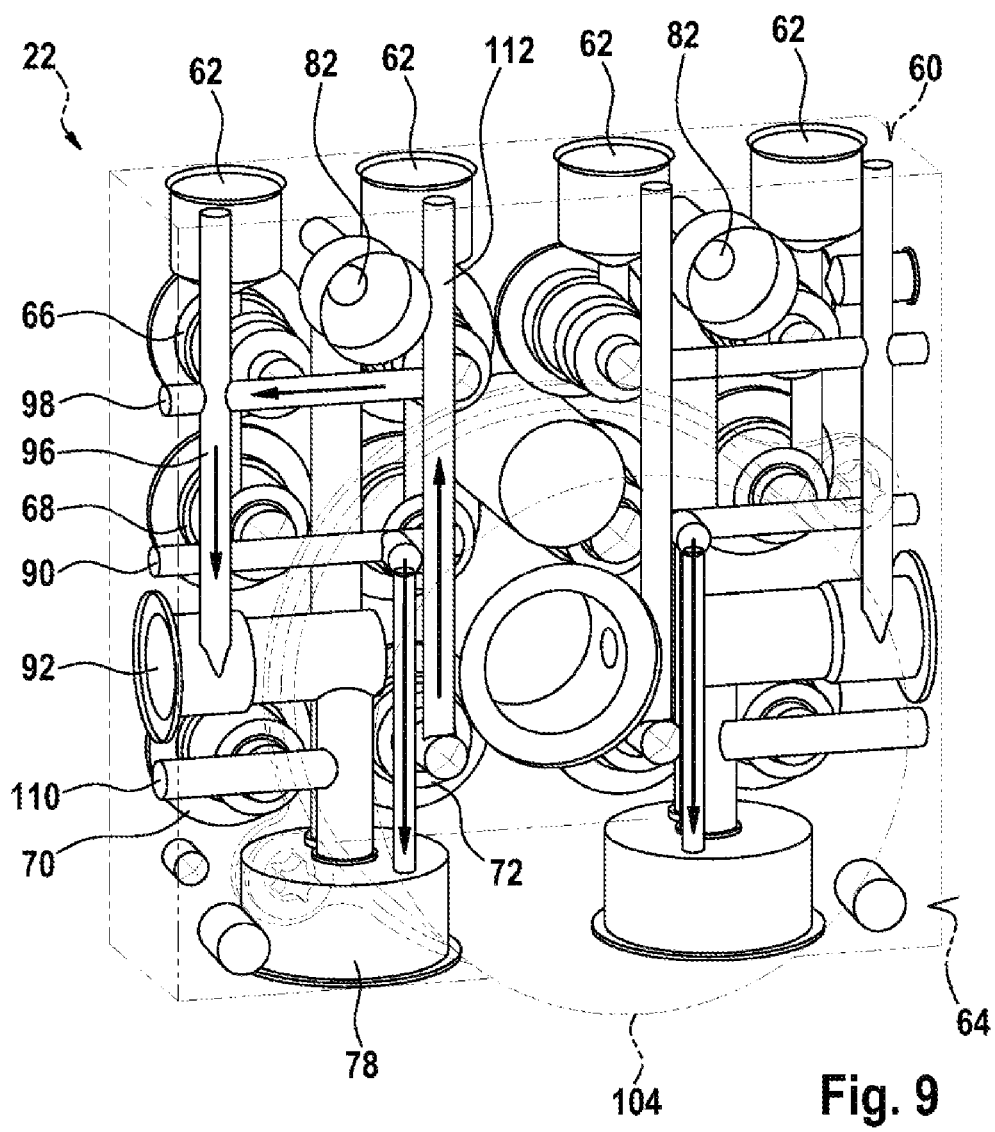
FIG. 9 shows the view according to FIG. 8 with a fourth detail illustrated.

FIG. 9 illustrates a further detail of the design according to the disclosure, according to which the aforementioned line 38 between a switching valve opening 72, an associated pump element opening 92 and an associated inlet valve opening 66 is formed by means of an additional longitudinal bore 112, which is likewise designed as a blind bore and is led from the switching valve opening 72 behind past the pump element opening 92 up to the transverse bore 98. The longitudinal bore 112 thereby creates a fluid-carrying connection from the switching valve opening 72 first up to the transverse bore 98, from whence the longitudinal bore 96, likewise provided (but now of shorter design) leads to the pump element opening 92.

Figure 10:
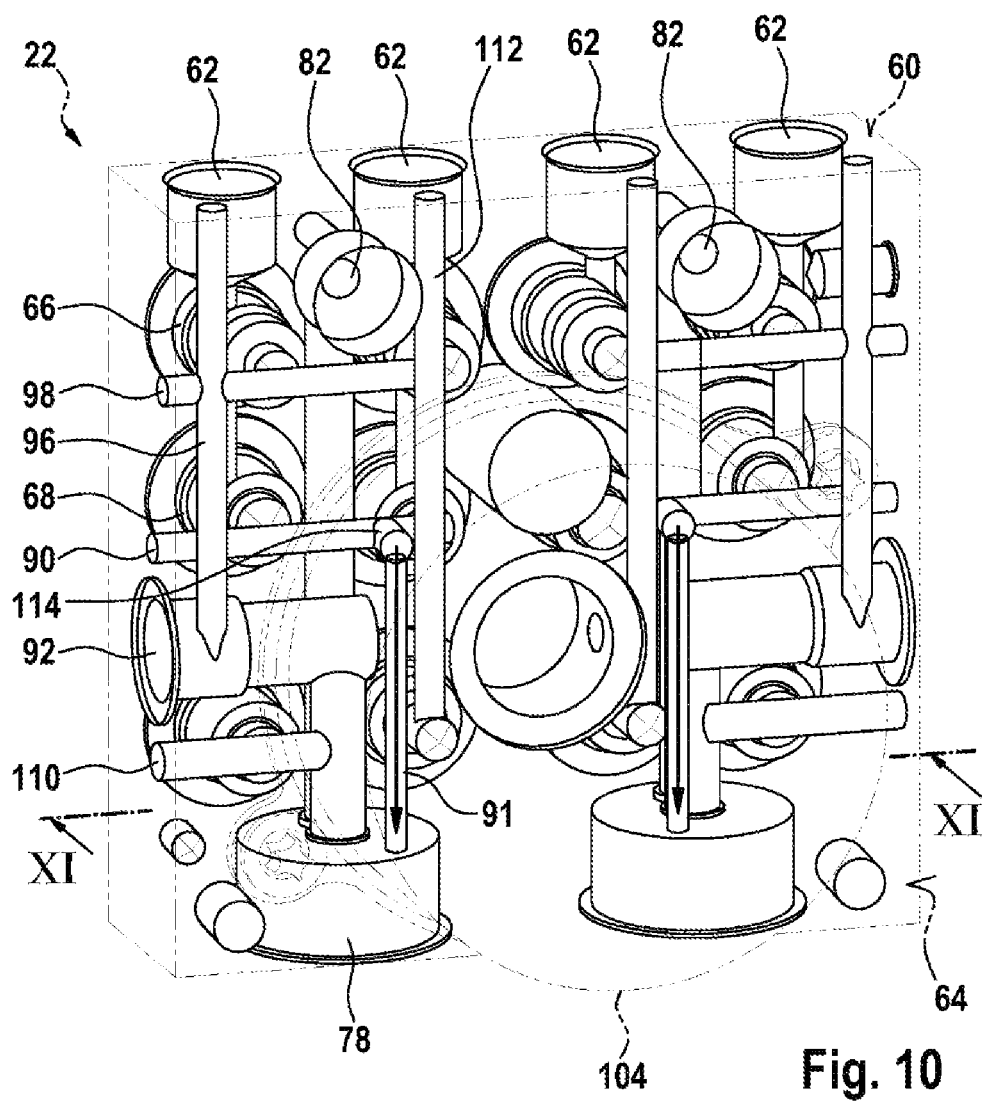
FIG. 10 shows the view according to FIG. 8 with a fifth detail illustrated and FIG. 11 shows part of the section XI-XI in FIG. 10.

FIG. 10, relating to the rear side 80 of the pump housing 22 according to the disclosure, illustrates that there the accumulator opening 78 and two outlet valve openings 68 are connected by way of a transverse bore 90, likewise provided, and a longitudinal bore 91 likewise emerging from the accumulator opening 78. For this purpose a further transverse bore 114 is formed as a short blind bore between the longitudinal bore 91 and the transverse bore 90.

Figure 11:
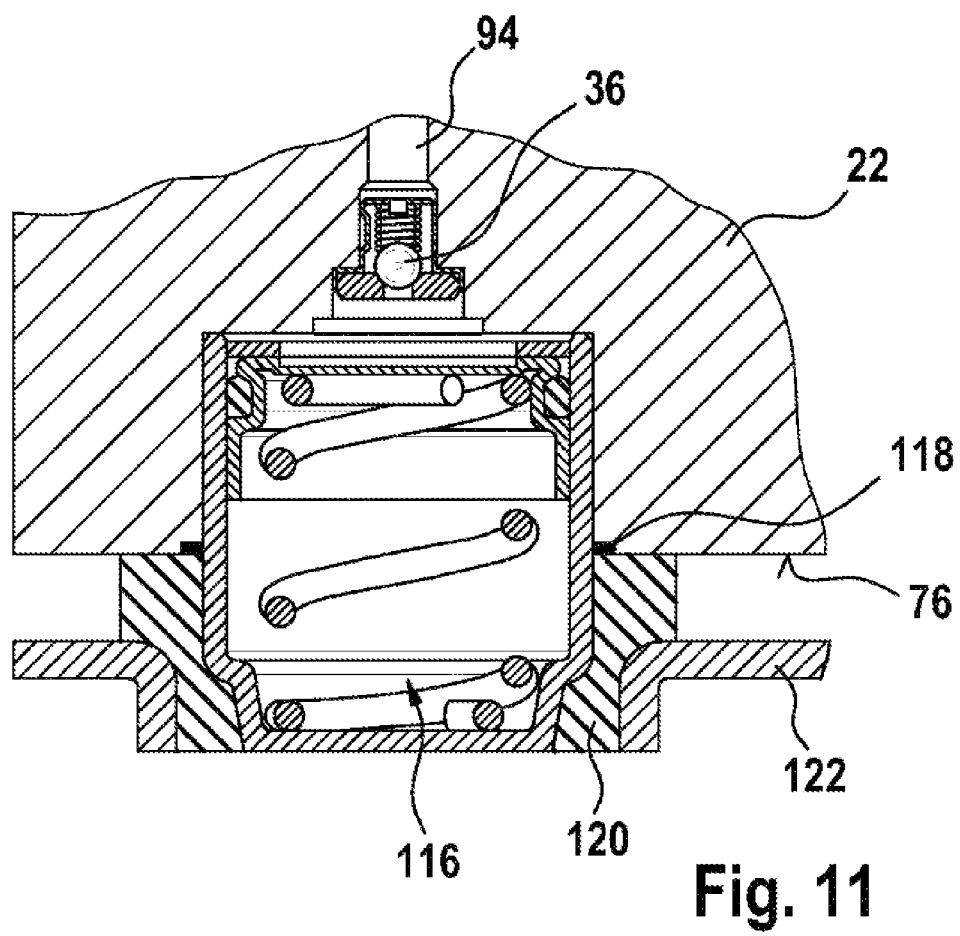

FIG. 11 finally illustrates that a cylindrical accumulator arrangement 116 is inserted in the accumulator opening 78 with the non-return valve 36 there inserted in the longitudinal bore 94. The accumulator arrangement 116 is welded to the underside 76 of the pump housing 22 by means of a circumferential weld seam 118. A spring element 120, on which a holder 122 for fixing the pump housing 22 to a vehicle, not represented further, is arranged, has then been pushed onto the accumulator arrangement 116.

The invention claimed is:

1. A pump housing assembly of a motor vehicle hydraulic assembly, comprising:
 a housing;
 at least two inlet valve openings defined in the housing;
 at least two outlet valve openings defined in the housing;
 at least one high-pressure control valve opening defined in the housing;
 at least one switching valve opening defined in the housing; and
 a pressure sensor connection defined in the housing,
 wherein the at least two inlet valve openings are defined in a first row, the at least two outlet valve openings are defined in a succeeding second row, the pressure sensor connection is defined in a further succeeding third row and the at least one high-pressure control valve opening is defined together with the at least one switching valve opening in a further succeeding fourth row.

2. The pump housing assembly as claimed in claim 1, wherein:
 the at least one high-pressure control valve opening includes two high-pressure control valve openings,
 the at least one switching valve opening includes two switching valve openings, and
 the two switching valve openings are defined in the housing between the two high-pressure control valve openings.

3. The pump housing assembly as claimed in claim 1, further comprising:
 at least one master cylinder connection defined in the housing; and
 a line connected to the at least one master cylinder connection,
 wherein the pressure sensor connection opens directly into the line.

4. The pump housing assembly as claimed in claim 1, further comprising:
 at least one master cylinder connection defined in the housing; and
 a line connected to the at least one master cylinder connection,
 wherein at least one of the at least one switching valve opening and the at least one high-pressure control valve opening is connected to the line by of a recess defined in the housing.

5. The pump housing assembly as claimed in claim 1, further comprising:
 a pump element opening defined in the housing;
 an accumulator opening defined in the housing;
 a first connecting line; and
 a first bore connecting the at least one high-pressure control valve opening to the first connecting line.

6. The pump housing assembly as claimed in claim 1, further comprising:
 at least one pump element opening defined in the housing;
 a second connecting line connecting the at least one pump element opening to an inlet valve opening of the at least two inlet valve openings; and
 a second bore connecting the at least one switching valve opening to the second connecting line.

7. The pump housing assembly as claimed in claim 1, further comprising:
 at least one accumulator opening defined in the housing;
 a third connecting line connecting the at least two outlet valve openings to one another; and
 a third bore connecting the at least one accumulator opening to the third connecting line.

8. The pump housing assembly as claimed in claim 7, further comprising:
 an accumulator welded to the at least one accumulator opening.

9. A motor vehicle hydraulic assembly comprising:
 a pump housing defining: (i) at least two inlet valve openings, (ii) at least two outlet valve openings, (iii) at least one high-pressure control valve opening, (iv) at least one switching valve opening, and (v) a pressure sensor connection,
 wherein the at least two inlet valve openings are defined in a first row, the at least two outlet valve openings are defined in a succeeding second row, the pressure sensor connection is defined in a further succeeding third row and the at least one high-pressure control valve opening is defined together with the at least one switching valve opening in a further succeeding fourth row.

* * * * *